PHASE CORRECTION FOR MULTIPLE TRACK RECORDINGS

Filed July 19, 1956 2 Sheets-Sheet 1

INVENTOR.
WAYNE R. JOHNSON
BY
Lippincott & Smith
ATTORNEYS

July 8, 1958 W. R. JOHNSON 2,842,756

PHASE CORRECTION FOR MULTIPLE TRACK RECORDINGS

Filed July 19, 1956 2 Sheets-Sheet 2

INVENTOR.
WAYNE R. JOHNSON

BY Lippincott & Smith

ATTORNEYS

United States Patent Office 2,842,756
Patented July 8, 1958

2,842,756

PHASE CORRECTION FOR MULTIPLE TRACK RECORDINGS

Wayne R. Johnson, Los Angeles, Calif., assignor, by mesne assignments, to Minnesota Mining & Manufacturing Co., St. Paul, Minn., a corporation of Delaware Application July 19, 1956, Serial No. 598,928

2 Claims. (Cl. 340—174)

Figure 1:
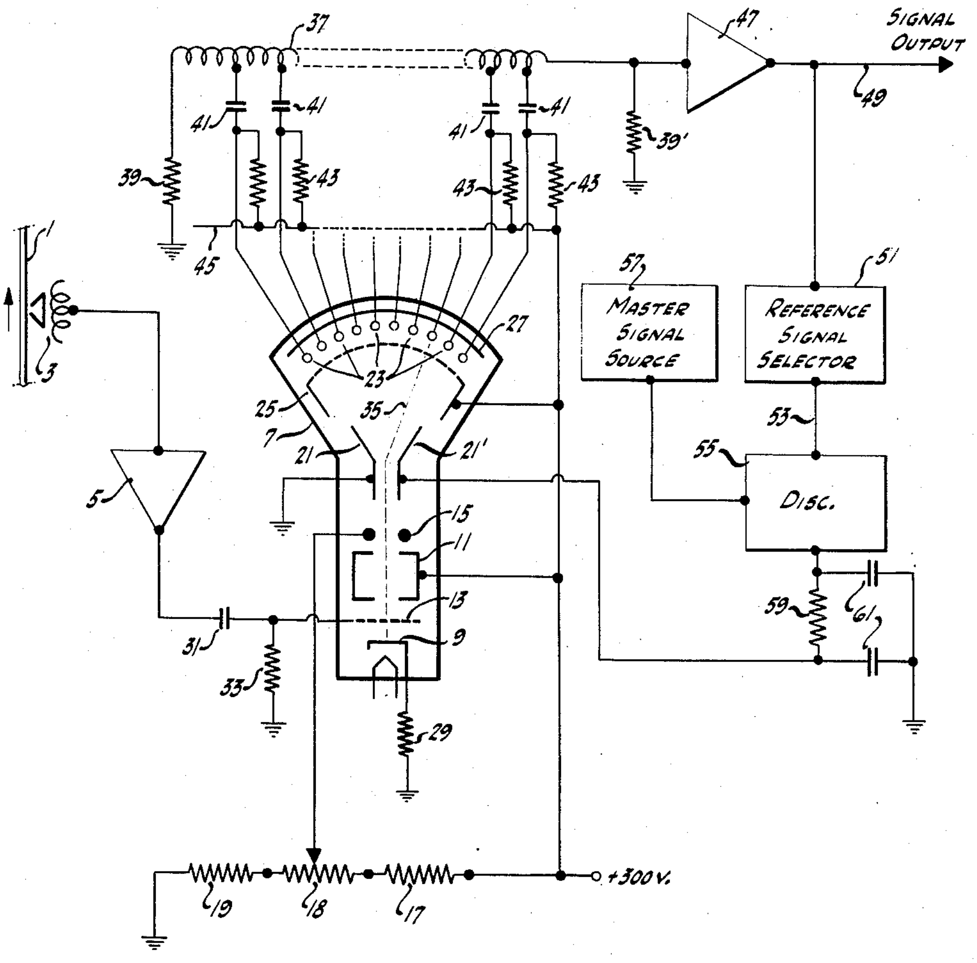

This invention relates to the maintenance of constant phase relationship between two signals each containing a time-reference component. It is especially applicable to reproduction of signals simultaneously recorded on a moving medium, such as magnetic tape, to maintain the relative phase of such signals in the same relationship as that at which they were recorded. Particularly, the invention is applicable to television signals that are magnetically recorded on a moving tape, where it is necessary for good reproduction that the signals as reproduced remain accurately in relative phase. Such phase accuracy is necessary both in cases wherein the frequency band of a luminance signal is split, in order that the various frequencies comprising the signal may be recorded on a medium moving at a slower rate than would be required if the entire frequency spectrum were to be recorded on a single track and in cases where related information of different kinds must be correlated in reproduction, as in the case of color television signals that include both luminance and color information, recorded on separate tracks. The invention of this application is a development of, and for certain purposes, an improvement on that disclosed in the copending application of the same inventor, Serial No. 507,005, filed May 9, 1955, and entitled Phasing System for Multiple Track Recordings.

Because of the large amount of information and the corresponding wide frequency spectrum employed in television it is important that the maximum amount of information possible be recorded per inch of recording tape. Using the best techniques generally known, successful recordings have been made of frequencies up to about 9,000 per inch of the recording medium. Sharpness of reproduced detail depends upon accurate phasing of the high frequency components of the signals. The recording tapes employed are from one-quarter to one-half inch or more wide, depending upon the method of recording used and whether the signals are representative of monochrome or color. A relative misalinement of recording and reproducing heads of $1/20{,}000$ of an inch is sufficient to reverse the phase of the high frequency signals, which, of course, will give entirely wrong results in the reproduced picture. If the recording and reproduction is accomplished on different apparatus, and there is a misalinement of the order of $5/100{,}000$ of an inch as between the recording and reproducing equipment, an error of the order of magnitude mentioned will be present in the reproduced signals. Even if the recording and reproducing are done on the same machine, vibration of the tape can change its angle of attack with respect to the transducer heads in recording and reproduction. This type of phase error is not constant but varies continuously, and is what is referred to herein as "flutter." Actually misalinement of the heads, due to a permanent error in angle of attack, is referred to as a "skew."

Assuming that two tracks are separated on a tape by a quarter-inch, an error in angle of attack of less than one minute of arc is sufficient to cause complete dephasing. Correction of errors as small as this is difficult even with respect to skew. To eliminate flutter to a degree which will permit such accuracy is even more difficult.

The tension which is applied to a moving tape in practice and the forces which cause it to vibrate are such that the rate of vibration to be expected is well within the range of audibility, and usually within the lower range. It will vary with different types of tape drive, but will seldom be above a few hundred cycles per second. Although the waveforms assumed by flutter may be complex, they are usually quite closely sinusoidal. The errors due to skew are either constant or vary very slowly in comparison with those due to flutter.

Under the standards of transmission of television signals that have been adopted in the United States the raster of a television picture is traced at the rate of 15,750 lines per second (very slightly different in the case of color transmissions), each line being 63.5 microseconds long, very nearly. With flutter rates of a few hundred per second the change in relative phase as between separate tracks during the period of a single line is therefore relatively small, even in the portion of the vibrational cycle when the rate-of-change is greatest. Blanking and synchronizing pulses are transmitted at the end of the each line and no picture signals are transmitted during the blanking interval. Such blanking signals must be introduced into each track. Therefore either the blanking signals themselves or signals introduced during the blanking interval can be used as time-reference signals to compare the phases of the signals on the tracks and it can safely be assumed that if the signals reproduced are in the proper relative phase with respect to the time-reference signals reproduced at the beginning of a lint (or the end of the preceding line) they will remain so nearly in phase to the end of the line that the error may be neglected.

The invention as disclosed in the prior application referred to, insofar as it relates to the present invention, involves the use of one of the tracks on which the signals are concurrently recorded as a master track, the signals recorded upon it being used as a reference or standard of phase with which the signals recorded on the other track or tracks are brought into coincidence. The reproducing channels, including transducers engaging the various tracks, can therefore be referred to, respectively, as a "master channel" and "slave channels." Delay lines are introduced into each channel, following the transducers heads used for pickup and, preferably, preamplifiers for building up the amplitude of the signals. The signal from the master channel is the norm or standard time-reference with which signals in other channels are compared; it may itself be subjected to variable delay to bring it into phase with a more nearly absolute reference, but so far as the present invention is concerned it could be subject to a constant, fixed delay. The delay line introduced into each slave channel is capable of providing a variable time delay. Means are provided for selecting from the reproduced signals the time-reference signals, which are preferably of pulse form, from each of the channels. The signals from master and slave channels are compared in a suitable form of discriminator, wherein they develop an error signal.

The error signal depends in magnitude and polarity upon the magnitude and direction of the time-difference between the reference pulses in the master and slave channels. This signal is used to control the amount of delay introduced by the delay line in the slave channel, decreasing the delay if the slave channel signal lags that in the master channel and increasing the delay if the slave channel signal leads that in the master channel. With sufficient gain introduced into the feedback loop wherein the control error signal is developed, the time-difference between the signals in the various channels may be reduced to as great an extent as may be desired.

A misalinement of the reproducing transducer-heads with respect to those used in recording results in the record of simultaneously recorded signals reaching one of the heads before the corresponding signal reaches another so that the later signal is delayed mechanically. In accordance with the prior invention the signal in the master channel is further delayed electrically. The corresponding signal in the slave channel is also delayed, but the delay in this signal is varied by changing the electrical length of the delay line through which it is propagated, so that the total of its electrical and mechanical delay is equal to the total of the electrical and mechanical delay of the corresponding signal in the master channel.

The present invention employs the broad principle above stated, but relates to a specific method and apparatus for varying the delay so introduced. Among the objects of the present invention are to provide means for introducing a variable delay wherein it is unnecessary to change the terminating impedance of the delay line employed in order to prevent reflections and echoes of the signals propagated through it; to provide a delay-line wherein the variation in delay is accomplished by changing the point at which the signal is introduced into the line, rather than by changing the electrical characteristics of the line itself; to provide means for accomplishing the purposes as set forth which employs standard commercial parts; and to provide apparatus of the character described which, under certain conditions, is easier of adjustment and more readily reproducible than that heretofore disclosed.

In accordance with the present invention the delay line in the master circuit may be fixed; i. e., it may be of constant electrical length so that the delay introduced by it is a constant, or it may be itself variable and controlled so as to average out temporary fluctuations and give a fixed norm against which the signals in the other channels are compared. Insofar as the present invention is concerned which of these two arrangements is used makes no difference, since it is primarily concerned with bringing all of the signals in the various channels into a common phase relationship, even though there may be some phase modulation in the master channel and hence in the other channel or channels as well. The signals from the output of the delay line are supplied to suitable means for selecting from them the time-reference signals. For television purposes such selection will normally be on a time basis, and the selecting means will be a gating circuit which is operative to pass on the signals interposed in the blanking period, but for other types of signals frequency-selection can be used, the time reference signal being in this case a continuous wave of a frequency outside of the band occupied by the message signals. The selected signals are fed to a phase comparator circuit, such as a phase discriminator of conventional type.

The delay line in the slave circuit is of such length that the delay introduced thereby, in a signal traversing its entire length, is equal to the sum of the time difference, plus and minus, which can occur between the master and slave channels, due to flutter and skew. The delay line is terminated at each end in its characteristic impedance and is provided with a plurality of taps, uniformly spaced along its length. The signals from the transducer in the slave channel are supplied to the delay line through electronic switching means which operates in response to the magnitude and polarity of a control voltage. The output from the delay line is taken across one of the terminal impedances and the time-reference signals occurring in this channel are selected by gating or filtering, the same manner as those in the master channel, and fed to the comparison device or phase discriminator. The error voltage developed in the latter is then applied to the electronic switching means in such sense as to switch the input to the transmission line to the proper tap to minimize the time difference between the reference signal from the outputs of the two transmission lines.

The preferred electronic switching means comprises a vacuum tube having means for developing a beam of cathode rays, a control electrode in the path of the beam to which the input signal from the transducer in the channel is connected, a plurality of anodes corresponding in number to the taps on the delay line, and means for deflecting the beam successively between the various anodes in response to the magnitude of the control signals developed by the phase discriminator.

Tubes of this character are commercially available with ten anodes between which the electron beam can be switched. If it be assumed that the probable deviation due to flutter and skew is 360° plus or minus from the master channel, and the tapped delay line is of the right length to give a total delay of two periods of the highest frequency to be transmitted, the ten taps provide for a phase difference of 72 electrical degrees between steps. With switching equipment of this type, however, the signal will divide between adjacent anodes in its passage from one to the next and it can be shown that the delay of the resultant signal of this frequency as fed to the two channels is proportional to the weighted average of the signals entering the line from adjacent taps. A continuous change of phase is therefore provided for. Usually the mechanical equipment can be made with sufficient accuracy so that phase displacements of less than plus-or-minus 360° from a master channel can be maintained, particularly if the master channel occupies a central position on the tape. That summation of the signals will give the right waveform when the signal is divided between two taps holds as long as the phase difference between successive taps is less than 90°, but it is, of course, desirable to make the electrical angle that separates the taps as small as possible, in view of the total correction to be made, in order to reduce secondary errors.

Figure 2:
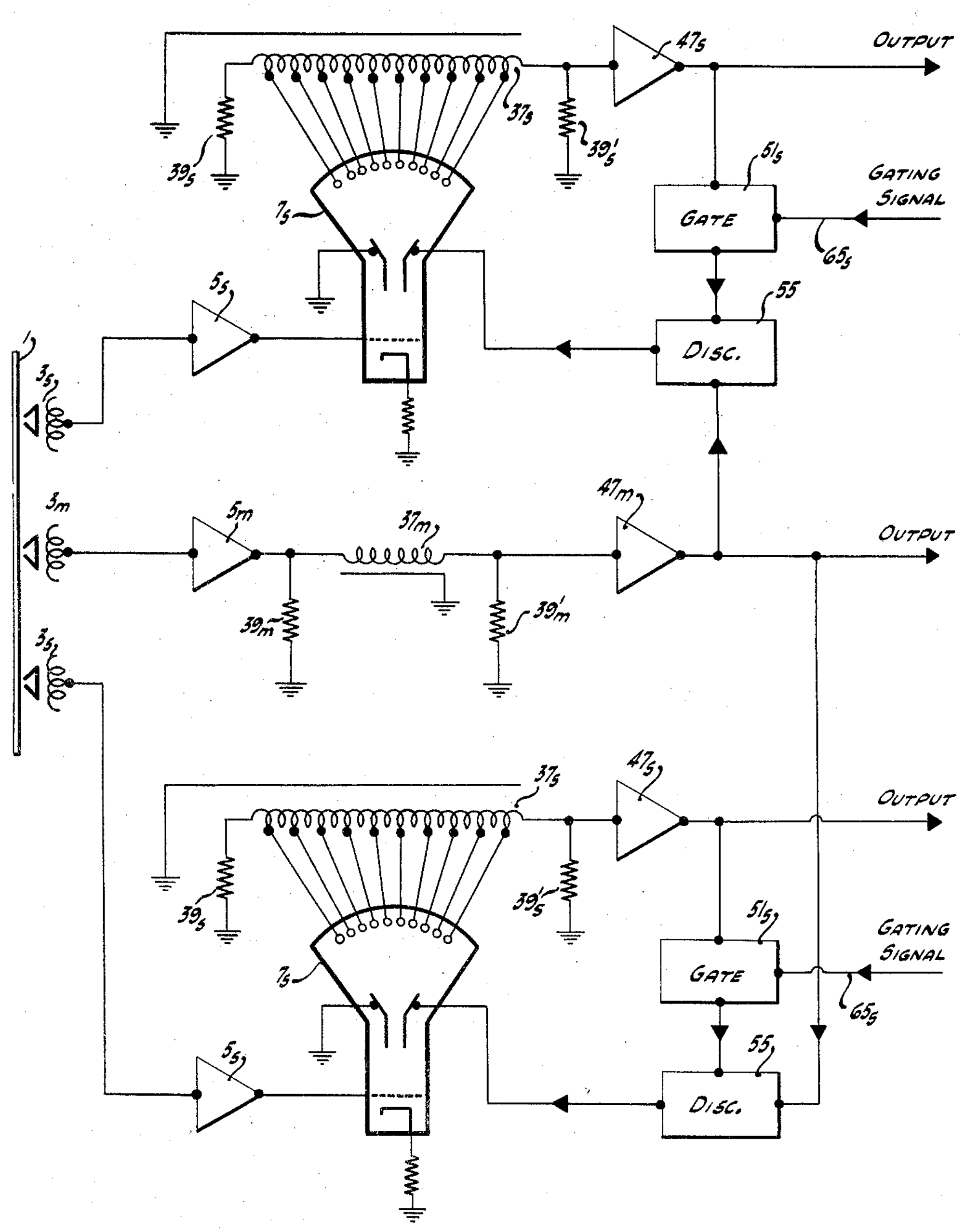

In the drawings which illustrate the detailed description of a preferred form of the invention which follows:

Fig. 1 is a diagram, partly in schematic and partly in block form, illustrating in detail the application of the invention to the maintenance of a constant phase relationship between a reproduced "message" signal combined with a time reference signal and a comparison signal from any source; and Fig. 2 is a simplified diagram, indicating an arrangement for keeping the signals in two "slave" channels in constant phase relation with the signals in a master channel.

The elements of the broad invention are shown in Fig. 1, schematically and in detail insofar as they relate to the critical factors entering into the invention and in block form where conventional apparatus is employed. In the figure the recording medium, e. g., a magnetic tape 1, is engaged by the transducer head 3. The tape is progressed past the head by conventional means, not shown, and in applications where the present invention would be employed the tape drive will in general include some form of servo mechanisms for keeping the average rate of progression extremely constant and thereby effectively eliminating phase shifts in the reproduced signal other than those due to flutter and skew. Since such mechanisms are known in the art they are not shown nor indicated since they would only add to the complexity of the description and drawings.

In the application of the invention as shown in this figure it is assumed that the requirement is that the reproduced signal must be held in a constant phase relationship with respect to a time reference signal from some comparison source, and that the recorded signal itself contains a time reference signal for comparison with the source. The reference signal may be of several varieties; if the signals to be reproduced operate within a specific frequency band the time-reference signal may be a sine wave of some frequency lying outside of this band, or, in the case of a television signal which is interspersed with blanking pulses, recurring at regular intervals, the time-reference signals may be pulses transmitted within the blanking period.

The signals picked up by the transucer 3, including the time reference component, are amplified by a preamplifier 5 and then applied to an electronic switching means which is adapted to switch signals fed to it successively to a plurality of output circuits in accordance with the magnitude and direction of a control potential. In its preferred form this switching means comprises a line-beam switch tube, one tube of this character being commercially available under the designation "LBS 1." This particular tube comprises means for developing an electron beam having a generally linear cross-section; i. e., the beam is long in one dimension (perpendicular to the plane of the diagram) and quite narrow in the plane of the diagram. The electrons forming the beam are emitted from a cathode 9 and accelerated by an anode 11, which is apertured to permit the electrons to pass on through it. Between the cathode and the anode is a control electrode 13. This is in the form of a grid through which the beam can pass, and its intensity or electron density modulated in accordance with a voltage applied to the grid, as in the case of the conventional triode. Under typical operating conditions the accelerating anode is operated at a potential of about 300 volts positive to ground. After passing through the anode the beam next passes between a pair of focusing electrodes 15 which are maintained at a voltage somewhat negative to the accelerating anode. The voltage applied to the focusing electrode should be adjustable in order to obtain the desired degree of focusing of the beam at the collector anodes of the tube. In the connection shown the anode 11 is connected to a 300 volt source and is also connected to ground through a series of resistors 17, 18 and 19. These resistors may total somewhere in the neighborhood of 125,000 to 150,000 ohms. Resistor 18 has a potentiometer tap which connects to the focusing electrodes and with which the focusing electrode potential can be adjusted within a range of from approximately 25 volts to 75 or 80 volts positive to ground.

The beam next passes between a pair of deflecting plates 21 and 21' and thence to one or possibly two of a series of linear anodes, collectively indicated by the reference character 23. A shield or screen 25 surrounds the path of the beam between the deflecting plates and the anodes 23, and an outer shield 27 lies behind the anodes, elements 25 and 27 both being operated at the potential of the accelerating anode so as to collect any stray electrons and remove them from the field of operation of the tube.

As in the case of the more usual triode, the cathode 9 is provided with a biasing resistor 29. The signal from the preamplifier 5 is applied to a control grid 13 through a blocking condenser 31 and the grid 13 is maintained, on the average, ground potential by means of a conventional resistor 33. The beam, indicated by the dotted line 35, is therefore modulated by the signal from the transducer 3 and falls upon one or another of the anodes 23 or divides between two adjacent anodes in accordance with its position as deflected by the field between deflecting plates 21 or 21'. Plate 21 is shown as grounded; plate 21' has applied to it an error signal which determines the position of the beam and the anode impacted by it as will later be described.

Each of the anodes 23 is connected to a separate tap on a delay line 37. The delay line is terminated at each end by its characteristic impedance, as shown by resistors 39 and 39'. Blocking condensers 41 are interposed between the anodes 23 and the taps on the delay line. An anode resistor 43 connects between each anode and the corresponding condenser 41. Each of the anode resistors connects to a common bus 45, which supplies to it the same 300 volt potential as is applied to the accelerator anode and the shield.

It should be evident that when the electron beam is falling on any individual ande, the cathode-control-grid-anode combination is essentially that of a pentode.

The beam current reaching the anode flows through the anode resistor 43, and the varying drop in the resistor applies voltage at signal frequency to the appropriate tap on the delay line 37.

The resistors 43 may be of the order of 10,000 ohms resistance each. The delay line 37 may have a characteristic impedance of the order of a few hundred ohms at most. Therefore neither the effective impedance of the line or its delay is materially effected by the taps. Since the delay line is terminated in its characteristic impedance at each end, the impedance looking into it from any tap appears the same. Accordingly, the signal divides, one half traveling in each direction. That portion of it traveling toward terminating impedance 39 is absorbed therein. The portion traveling through the delay line in the opposite direction also has its energy dissipated in the terminal resistor 39', resulting in a voltage drop therein which is applied to the input of an amplifier 47. The output of this amplifier supplies the output message signals to a line 49.

A time-reference signal selector 51 is also connected to the output of amplifier 47. The nature of this selector will of course depend on the nature of the time reference signals. If these are in the form of a continuous wave the selector 51 can be a bandpass filter, tuned to the frequency of the reference signals. If the signals are recurring pulses the selector may be a gating circuit; in the case of television signals this circuit may be actuated by blanking pulses, the gate opening during the blanking signal to pass pulses occurring during this interval.

Whichever type of time-reference signal is used, the reference signals and these alone are applied through a lead 53 to a phase discriminator 55, in which they are compared to signals of a comparison source 57. This source may be a stabilized oscillator, a signal from a different track, or any other source with which the reproduced signal must be kept in phase. The phase discriminator can assume any of several forms well known in the art, such as the well known type which iss employed in most televeision receivers for maintaining the horizontal sweep circuits in synchronism with the synchronizing pulses that are transmitted at the end of every line during the blanking pulses. It is, in fact, possible to use these synchronizing pulses, if recorded, for maintaining the desired phase synchronization in the reproduced signals contemplated by the present invention.

Whatever form of phase discriminator may be employed, what is developed by it is an error signal which depends in polarity upon the time-sequence of the reproduced signals from the amplifier 47 and the comparison source 57, and in magnitude upon the magnitude of the time-difference. The error signal will, in general, have superposed upon it a variable component containing relatively high frequencies. These are filtered out by a filtering or integrating circuit comprising a series resistor 59, shunted at each end by capacitors 61. The time constant of the integrating circuit should be comparable in magnitude to the repetition rate of the reference pulses, so that no major fluctuation in magnitude of the error signal occurs between the time reference signal recurrence but the signal will nonetheless follow variation in magnitude of the error signal. It is this error signal that is applied to the deflection plate 21'.

The feedback loop between the terminating impedance 39' and the deflecting plate 21 should provide a high degree of amplification. The position of the amplifier providing this can be anywhere around the loop.

All the amplification can be provided by amplifier 47, as shown, but additional amplifiers can be inserted between line 49 and time-reference selector 51, between the latter and the discriminator 55, or D. C. amplification can be provided following the discriminator. The criterion is that the amplification should be sufficient so that a tolerable residual phase-discrepancy in the output of amplifier 47 and the comparison signals from the source 57 will yield an error signal sufficient to sweep the beam 35 across the entire array of anodes 23.

Fig. 2 shows the application of the invention to the reproduction of television signals, the equipment being arranged to maintain the signals in two slave channels in phase with the signals in a master channel. In this figure the showing is in a highly simplified form, only the switching tubes and delay lines being shown schematically and the switch tubes showings being simplified by the elimination of all the auxiliary, beam-forming electrodes, leaving only those electrodes to which connections are made that enter directly into the switching operation.

In the arrangement shown in Fig. 2 it is assumed that the master signal, with which the others are compared, is that recorded on the central channel, occupying the median line of the tape. With most apparatus, this channel will be that subjected to minimum flutter, but even if it is not, its phase will under ordinary circumstances be the average of those of the signals recorded on the record, both as regards to flutter, and as to permanent skew. It will not necessarily be the average if the gaps in the transducers which effect either the recording or the reproduction are staggered instead of being permanently alined, but methods of manufacture are available which permit extreme accuracy in the alinement. With techniques that are available for compensating mechanical fluctuations in the drive of the tape and maintaining the average speed of the tape constant, such slight phase modulation as remains in the master channel may be unimportant; if it is not, the master channel may also be provided with compensating arrangement as here shown, tied into a servo system which itself provides a comparison signal for all channels, as described in the prior application above referred to.

In Fig. 2 the elements that have already been described in detail in Fig. 1 are designated by the same reference characters, distinguished by the subscripts "*m*" and "*s*" where they refer specifically to the master or slave channels respectively. The three tracks on the tape 1 are engaged by the transducer heads 3 and supplied to preamplifiers 5 in each channel, the master channel transducer head $\mathbf{3_m}$ engaging the central record track as has already been described. The two amplifiers $\mathbf{5_s}$ are each connected to the control electrodes of switching tubes $\mathbf{7_s}$. The anodes of these tubes connect to taps on delay lines $\mathbf{37_s}$, each terminated at both ends with resistors $\mathbf{39_s}$ and $\mathbf{39'_s}$, and each supplying an output amplifier $\mathbf{47_s}$.

The output from preamplifier $\mathbf{5_m}$ is supplied to the input end of a delay line $\mathbf{37_m}$ which differs from the lines $\mathbf{37_s}$ in that it is preferably of only one half the electrical length of the lines $\mathbf{37_s}$ and it need not be tapped. The half-length delay line is provided to give the master signal the average delay of the two slave channels, since in general the signal in one would be advanced and the other retarded by flutter of skew. The delay line $\mathbf{37_m}$ is, of course, terminated in its characteristic impedance at each end as in the case of the variable delay line. Output amplifier $\mathbf{47_m}$ is connected across the output resistor $\mathbf{39'_m}$, and branch leads from its output connect to phase discriminators 55.

The other inputs to discriminators 55 are supplied from the output of amplifiers $\mathbf{47_s}$ through time-reference selectors $\mathbf{51_s}$, which for this service take the form of gates. The gates may be coincidence tubes or any of the various types of gating circuits which are well known in the art. Gating signals are supplied through the gates through leads $\mathbf{65_s}$ and may be derived in any of various ways, such as have been described in the prior application above cited. It is convenient to derive the gating signal from a blanking signal, so that the gates will pass the time reference pulses at any time during the blanking interval, the blanking pulses being recorded on all tracks. The gating pulses may be therefore taken from the master channel directly or from a sync generator tied in with the output signals.

It may be noted that no gating circuit is necessary in the connections between amplifier $\mathbf{47_m}$ and the discriminators, since it is characteristic of discriminator circuits that they yield an output only when signals are provided in both of the inputs thereto. It is, of course, possible to gate the input to the discriminators from amplifier $\mathbf{47_m}$ if desired.

The electrical length of the various delay lines will, of course, depend on the maximum frequencies to be reproduced by the apparatus. If the signals transmitted are to include the highest frequencies in the band now allotted to television signals, i. e., 4 mc., a delay of one-quarter microsecond is the equivalent of one cycle of this frequency. The invention finds its greatest usefulness however, where one or another of the various bandsplitting technicques is employed. If such techniques are used the maximum frequency reproduced will be divided by at least two and the delay introduced by the delay lines will therefore have to be at least twice as great. On the original assumption that the mechanical inaccuracies to be corrected will not exceed 360 electrical degrees, or one cycle, plus or minus, of the highest frequency reproduced on the various tracks, and if this frequency is 2 mc., as would be required by 2:1 splitting of a 4 mc. band, delay line $\mathbf{37_m}$ should introduce a delay between its terminals of one-half microsecond while the delay lines $\mathbf{37_s}$ should each introduce a delay of 1 microsecond between the input terminal farthest from the terminating impedance $\mathbf{39'_s}$ and that terminal. It should be apparent that if there is any permanent misalinement between the various transducer heads it can be compensated by introducing an additional fixed delay in one or more of the slave circuits, or either extending the delay line $\mathbf{37_m}$ or shortening it to take care of the misalinement in the master circuit.

It will be appreciated that while proper termination to match the characteristic impedance of each of the lines is important, a mismatch will do most harm if it occurs in the terminations $\mathbf{39_s}$. As signals are introduced into the delay lines in the slave channels, from whatever tap, they will always divide and one half will travel away from the output amplifier $\mathbf{47_s}$. If the closing impedances $\mathbf{39_s}$ do not provide an accurate match to the line, a portion of the signal will be reflected and will appear at the input of amplifier $\mathbf{47_s}$ delayed by an amount which is proportional to the distance between the tap from which the signal is supplied and the terminal $\mathbf{39_s}$ plus an additional delay introduced by the entire length of the delay line. This reflected signal, if present, would appear as a ghost in the television image. Reflections from the output end of the delay line, however, and reflected back to the terminating impedance 39 will be absorbed in the latter and do little harm, since they will in any event be attenuated by their first reflection and practically completely attenuated in the impedance 39 instead of being reflected. Accurate terminations at both ends are always to be preferred.

What is claimed is:

1. A flutter compensator for maintaining in fixed phase relationship between signals reproduced from simultaneously made recordings on a plurality of tracks on a moving recording medium, the signals on each track including simultaneously recorded periodically recurring time reference signals, which comprises the elements designated as elements (*a*) to (*i*) and defined as follows: (*a*) a master reproducing channel including a transducer head adapted to engage one of said tracks and translate signals recorded thereon into electrical waves; (*b*) a slave channel also including a transducer head for translating signals recorded on another of said tracks into electrical waves; (*c*) a delay line connected in the channel of element (*a*) to delay signals picked up by the transducer head therein for a fixed interval; (*d*) a second delay line provided with taps substantially uniformly spaced along the length thereof; (*e*) terminating impedances matching the characteristic impedance of element (*d*); (*f*) electronic switching means operative to connect element (*b*) to a selected one of said taps on element (*d*) in response to a control voltage applied thereto; (*g*) means for selecting from signals passing through elements (*c*) and (*d*) a time reference signal included therein; (*h*) means for comparing the time phase of pulses selected by element (*g*) and developing therefrom a control voltage varying in polarity and magnitude with the direction and magnitude of the time difference in said reference signals; (*i*) connections for applying said control voltage to said electronic switching means to connect element (*b*) the tap on element (*d*) which will minimize the time discrepancy between the reference signals received by element (*h*).

2. A flutter compensator for maintaining in fixed phase relationship between signals reproduced from simultaneously made recordings on a plurality of tracks on a moving recording medium, the signals on each track including simultaneously recorded periodically recurring time reference signals, which comprises the elements designated as elements (*a*) to (*j*) and defined as follows: (*a*) a master reproducing channel including a transducer head adapted to engage one of said tracks and translate signals recorded thereon into electrical waves; (*b*) a slave channel also including a transducer head for translating signals recorded on another of said tracks into electrical waves; (*c*) a delay line connected in the channel of element (*a*) to delay signals picked up by the transducer head therein for a fixed interval; (*d*) a second delay line provided with taps substantially uniformly spaced along the length thereof; (*e*) terminating impedances matching the charactersitic impedance of element (*d*); (*f*) a vacuum tube including means for developing a beam of electrons, a control electrode for modulating the intensity of said beam, a plurality of separate anodes, and means responsive to a control voltage for deflecting said beam to fall successively upon successive ones of said anodes in response to successive two directional changes in said control voltage; (*g*) connections from element (*b*) to the control electrode of element (*g*); (*h*) means connected to elements (*c*) and (*d*) for selecting for said time reference signals from signals passing therethrough; (*i*) means for comparing the time phase of the signals selected by element (*h*) and developing therefrom a voltage dependent in magnitude and polarity upon the direction and magnitude of time difference of the time reference signals of elements (*a*) and (*b*); and (*j*) connections for applying the voltage developed by element (*g*) to the deflection means of element (*f*) to deflect the electron beam therein to the anode of element (*f*) and thence to the tap of element (*d*) which will minimize the time difference between the reference pulses through elements (*b*) and (*d*).

No references cited.